(12) United States Patent
Motwani et al.

(10) Patent No.: US 8,582,438 B2
(45) Date of Patent: Nov. 12, 2013

(54) DETECTING AND MITIGATING OVERLOAD ON SWITCHES BY WIRELESS MOBILE CLIENT DEVICES

(75) Inventors: Dhananjay C. Motwani, Union City, CA (US); Sudhir Jain, Fremont, CA (US); Jyoti Jain, Fremont, CA (US); Vikram P. Kumar, San Jose, CA (US); Nitya Sundareswaran, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 223 days.

(21) Appl. No.: 13/171,940

(22) Filed: Jun. 29, 2011

(65) Prior Publication Data

US 2013/0003547 A1 Jan. 3, 2013

(51) Int. Cl.
*H04L 12/26* (2006.01)

(52) U.S. Cl.
USPC .......................... 370/235; 370/310.2

(58) Field of Classification Search
USPC ......... 370/227, 228, 219, 220, 229, 230, 231, 370/235, 431, 310.2, 328, 338, 349
See application file for complete search history.

(56) References Cited

U.S. PATENT DOCUMENTS

| | | | |
|---|---|---|---|
| 7,177,649 B1 * | 2/2007 | Nielsen ........................ | 455/453 |
| 7,433,309 B2 * | 10/2008 | Rue .............................. | 370/232 |
| 7,509,129 B2 * | 3/2009 | Sinivaara ..................... | 455/453 |
| 7,580,716 B2 * | 8/2009 | Ransom et al. .............. | 455/453 |
| 7,991,403 B2 * | 8/2011 | Lee et al. ..................... | 455/453 |
| 2005/0053046 A1 * | 3/2005 | Wang ........................... | 370/338 |
| 2007/0204046 A1 | 8/2007 | Batta et al. | |

FOREIGN PATENT DOCUMENTS

| | | |
|---|---|---|
| EP | 1763204 A1 | 3/2007 |
| WO | 2006127887 A2 | 11/2006 |
| WO | 2006128161 A2 | 11/2006 |

OTHER PUBLICATIONS

CLI Command Reference, DWS-3000 Series, DWL-3500AP/8500AP, Unified Wired & Wireless Access System Release 2.1, May 2008, pp. 1-338.
International Search Report and Written Opinion in counterpart International Application No. PCT/US2012/039530, mailed Jul. 16, 2012.

\* cited by examiner

*Primary Examiner* — Brenda H Pham
(74) *Attorney, Agent, or Firm* — Edell, Shapiro & Finnan, LLC

(57) ABSTRACT

Techniques are provided to load balance point of presence traffic for a group of network devices, such as switches, that are configured to support network connectivity in a wired network for client devices that roam between wireless access points served by the respective switches. The point of presence traffic may tend to be allocated to a particular switch due to network topology, whereby the switch may be located at a building entrance and therefore receive the majority of new association requests for mobile devices entering the building. Load is monitored by each switch and load information is exchanged between the switches. Requests and responses are exchanged between the switches such that point of presence responsibility may be transferred to switches with a lighter load.

21 Claims, 6 Drawing Sheets ical FIELD

DETECTING AND MITIGATING OVERLOAD ON SWITCHES BY WIRELESS MOBILE CLIENT DEVICES

TECHNICAL FIELD

The present disclosure relates to wireless network environments in which wireless mobile client devices form a point of presence with a switch that serves one or more wireless access points.

BACKGROUND

Current wireless networks integrate wired and wireless services at the access layer. Converging the wired and wireless services allows mobility services to be provided to wireless mobile stations within an integrated mobility architecture. As wireless mobile client devices roam from one wireless access point to another access point that is managed by a different access switch, the network infrastructure tunnels the client traffic between the client device's point of presence at one access switch and point of attachment at the other access switch. Each access switch may serve a plurality of wireless access points and also serves as a connection point to the wired network.

When a wireless mobile client device first enters the wireless network it associates with a wireless access point managed by a switch. The first switch that the wireless mobile client device "attaches" to may be referred to as the "anchor" switch. The anchor switch provides a point of presence for the wireless mobile client device within the wired network and a point of attachment for the wireless network. When the wireless mobile client roams to another wireless access point managed by another switch, which referred to as a "foreign" switch, the point of attachment moves to the new switch while the point of presence remains with the anchor switch. The anchor switch needs to continue advertising the wireless mobile device's point of presence in the wired network even though the wireless mobile device's point of attachment is with a foreign switch which can lead to anchor switch overload in certain network environments.

DESCRIPTION OF EXAMPLE EMBODIMENTS

Overview

Techniques are provided to opportunistically load balance point of presence traffic for a group of network devices, such as switches, that are configured to support network connectivity in a wired network for client devices that roam between wireless access points served by the respective switches. The point of presence traffic may tend to be allocated to a particular switch due to network topology, whereby the switch may be located at a building entrance and therefore receive the majority of new association requests for mobile devices entering the building. Load is monitored by each switch and load information is periodically exchanged between the switches. Requests and responses are exchanged between the switches such that point of presence responsibility may be transferred to switches with a lighter load. The switch with the lighter load may be selected dynamically when a client device first enters the network.

A group of network devices is provided, where each network device is configured to support network connectivity in the wired network for mobile client devices that roam between wireless access points served by the respective network devices. At a first network device in the group, load associated with resource utilization of the first network device is monitored. The resources monitored may include hardware resources such as memory or processor use, or application specific integrated circuit (ASIC) capacity. The first network device periodically receives messages from the other network devices in the group indicating their respective loads. When the load of the first network device exceeds a predefined load level or has a higher load level relative to another network device, a second network device is selected from among the other network devices in the group that can take on additional load. The first network device detects when a wireless mobile client has associated with a wireless access point that it serves, and sends a request message to the second network device comprising information that is configured to request that the second network device serve as a point of presence in the wired network for the wireless client devices. At the first network device, a response message is received from the second network device comprising information configured to indicate acceptance by the second network device of the point of presence for the wireless client device.

The above mechanism results in a role change for the first and second network devices. The first network device becomes a foreign switch when it would otherwise be an anchor switch and the second network device serves as the anchor switch when it would otherwise be a foreign switch.

Example Embodiments

Figure 1A:
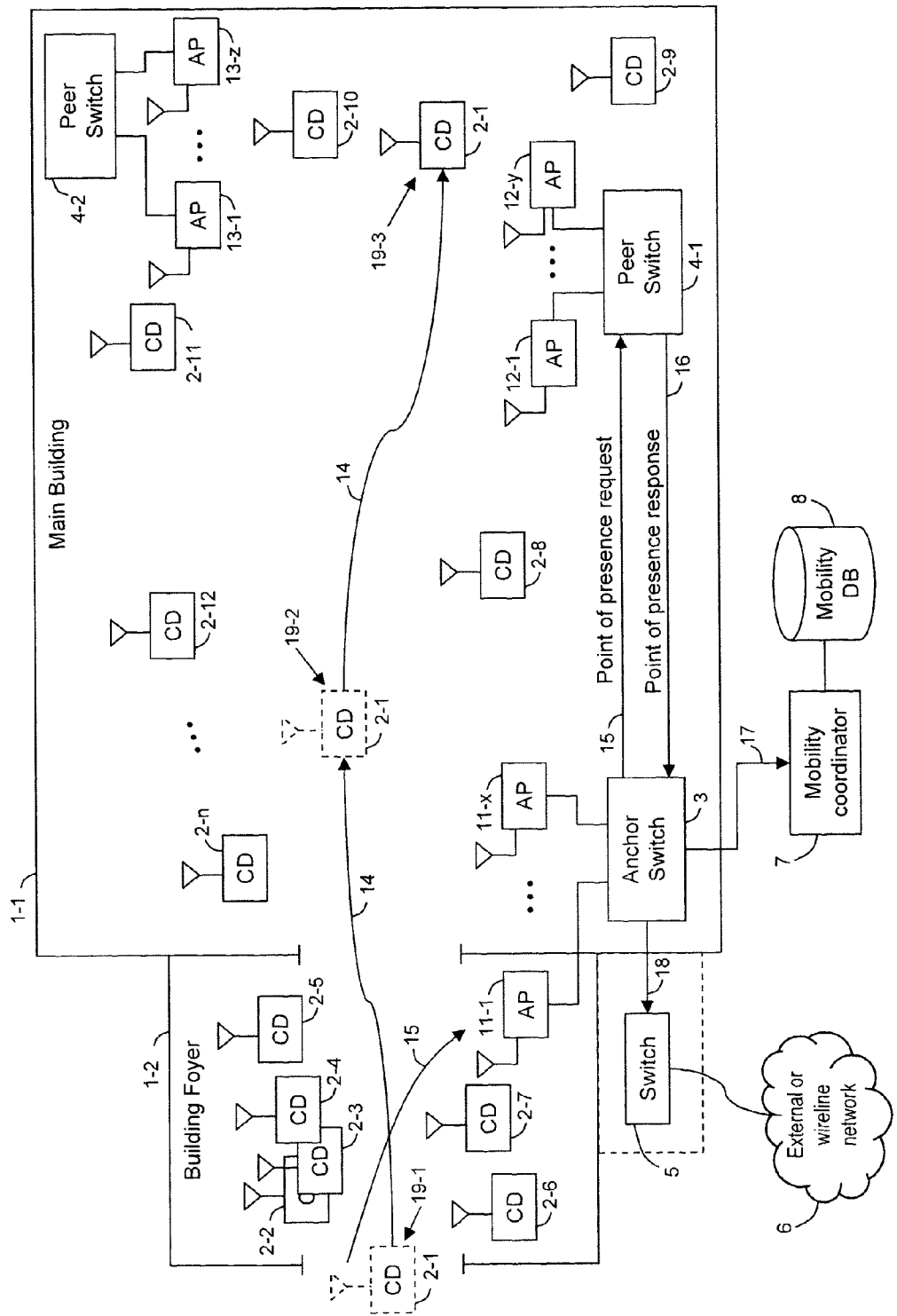
FIG. 1A is a block diagram of an example communication network environment in which wireless mobile client devices may roam from one wireless access point to another and in which a point of presence for the wireless mobile client devices is managed according to techniques described herein.

Reference is first made to FIG. 1A that shows a block diagram of a networking environment to which the techniques described herein are applicable. The networking environment shown in FIG. 1A generally depicts a configuration that is common in a wireless network for a building 1-1 and foyer 1-2, e.g., a school building, connected to wired network. There is a plurality of switches 3, 4-1, 4-2, and 5 configured to providing a wired network backbone. The switches 3, 4-1, 4-2, and 5 are also referred to herein as "peer" switches since they are part of the same wired network.

A plurality of access points (APs) 11-1 to 11-x, 12-1 to 12-y, and 13-1 to 13-z are coupled to switches 3, 4-1, and 4-2, respectively, for providing wireless connectivity to a plurality of wireless client devices (CDs) 2-1 to 2-n. Switch 5 is also capable of coupling to and serving/managing APs, but for ease of illustration switch 5 is not coupled to any APs in this example. CDs 2-1 to 2-$n$ may be WiFi™ capable cellular telephones, tablet computing devices, portable computing devices, or other mobile wireless communication devices.

Switches 3, 4-1, 4-2, and 5 are switches that contribute to an integrated mobility architecture for wireless client devices, e.g., CDs 2-1 to 2-$n$, as described above. Switch 3 is a labeled anchor switch as mentioned above for reasons will be further described hereinafter. Switches 4-1 and 4-2 are labeled as peer switches. Switches 3, 4-1, 4-2, and 5 are all peers of each other with regard to the wired network. Peer switches perform common functionality for local area network (LANs), virtual LANs (VLANs), and wireless LANs (WLANs) for a given network architecture. Switch 5 provides connectivity to external or other wireline networks 6. For example, switch 5 may provide connectivity to a campus intranet or to the Internet so that wireless CDs roaming throughout building 1-1 and foyer 1-2 can access those networks.

The main building 1-1 and foyer 1-2 may be part of a university or corporate campus in which the foyer 1-2 provides a common entryway for the rest of building 1-1 which may include a plurality of classrooms. As the wireless CDs enter the foyer 1-2 they usually associate with an access point (AP) that provides the best wireless signal. For example, in a university deployment students typically carry two or more wireless devices. When there is a sudden burst of students entering the foyer 1-2 and headed to their respective classrooms, switch 3 becomes the anchor switch since it is the first point of attachment. As students roam away from the APs coupled to anchor switch 3, the point of presence continues to stay with anchor switch 3 though the point of attachment changes to another switch. Thus, this mechanism results in a continuous consumption of resources on anchor switch 3 even after CDs change their point of attachment.

In this example, CD 2-1 enters the foyer and eventually migrates or roams to the other end of the building along path 14. The closest APs are usually selected for wireless CD association. As CD 2-1 enters the foyer 1-2 the closest AP is AP 11-1, and CD 2-1 transmits association request 15 to AP 11-1. AP 11-1 relays the association request 15 to anchor switch 3. In the normal course of events anchor switch 3 would become the anchor switch for CD 2-1, as was the case when CDs 2-2 to 2-$n$ previously entered or passed through foyer 1-2. However, by virtue of the techniques provided herein, anchor switch 3 does not become the anchor switch for CD 2-1. Instead, through a series of messages, another switch, e.g., peer switch 4-1 becomes the anchor switch for CD 2-1, while still maintaining the point of attachment via AP 11-1 and switch 3. Switch 3 now has a role as a foreign switch with respect to CD 2-1.

Since anchor switch 3 is already serving as a point of presence for CDs 2-2 to 2-$n$ a portion of its processing and hardware resources (e.g., ASIC resources) are dedicated to point of presence activities for those CDs. At the time CD 2-1 arrives in the foyer 1-2, anchor switch 3 may determine that its point of presence and/or hardware utilization have exceeded a defined limit and that anchor switch 3 will no longer serve as a point of presence for new CDs entering the network and select another switch to serve as the point of presence for new CDs. Switch 3 still retains its role in providing a point of attachment for those new CDs. If the point of attachment changes for the new CDs, switch 3 will no longer utilize hardware resources for the new CDs that have roamed. In addition, the IP addresses of the CDs that have roamed may be recycled in the Dynamic Host Configuration Protocol (DHCP) address pool.

Through exchanges of monitoring messages with other switches, anchor switch 3 learns that peer switch 4-1 is more lightly loaded than peer switch 4-2. Accordingly, anchor switch 3 sends a point of presence request message 15 to peer switch 4-1 for a particular CD, e.g., CD 2-1. The point of presence request message 15 comprises information configured to request that peer switch 4-1 serve as the point of presence for CD 2-1, and thus includes information identifying CD 2-1. Peer switch 4-1 determines that serving as the point of presence for CD 2-1 is acceptable and responds with a point of presence response message 16. The point of presence response message 16 comprises information configured to indicate that peer switch 4-1 will serve as the point of presence for CD 2-1.

The networking environment shown in FIG. 1A has a mobility coordinator 7 and a mobility database (DB) 8. The mobility coordinator 7 is, e.g., a WLAN controller device that is configured to provide a management point for a group of APs and to manage traffic routing between the wired and wireless networks. The mobility DB 8 stores mobility data for CDs within the network. Anchor switch 3 sends a message 17 to mobility coordinator 7 and message 18 to switch 5 indicating the mobility status of CD 2-1. The mobility status of CD 2-1 may be logged in the mobility DB 8. The messages 15-18 may be transmitted and received using a protocol known to the switches or within network keep alive messages.

As CD 2-1 moves from position 19-1 to position 19-2 along path 14, its point of attachment in the wireless network will change from AP 11-1 to AP 11-$x$ with other points of attachment possible in between. At position 19-3, CD 2-1 has moved into a coverage area served by APs 12-1 to 12-$y$ and establishes a wireless network point of attachment from among those APs, e.g., AP 12-$y$ which is the closest AP the CD 2-1's current position 19-3. Accordingly, CD 2-1 becomes a local client in addition to already being an anchor switch client, and peer switch 4-1 now processes data traffic and point of presence traffic for CD 2-1. Anchor switch 3 can remove CD 2-1 as a foreign client and is now free of CD 2-1's client data traffic as well. The process for load balancing the anchor switch 3 can be used to provide client load balancing among peer switches as new CDs enter the wireless network. The process for load balancing the anchor switch 3 has been briefly described in connection with FIG. 1A and will be further described hereinafter.

It is to be further understood that the configuration shown in FIG. 1A is a very simple configuration and that there are, in practice, many more network switches, APs, and mobility coordinators or controllers for any given WLAN deployment. Furthermore, the APs may be grouped according to subnets or VLANs in any given network environment. The term "AP" or wireless access point device is meant to refer to any wireless device that provides wireless connectivity in a wireless network, and is not to be limited to, for example, IEEE 802.11 Wi-Fi™ APs. For example the techniques described herein are applicable to other wireless networks, such as a WiMAX™ wireless network, where devices known as base stations in WiMAX parlance perform functions similar to that of an AP in a Wi-Fi wireless network. Likewise, the term "coordinator" or "controller" is meant to refer to any control element that controls a wireless device that provides wireless connectivity in wireless network, and includes for example, a wireless gateway device. A WiMAX wireless network is only one example of other wireless networks to which these techniques are applicable. Thus, the configuration shown in FIG. 1A is only meant to be an example for purposes of describing the techniques herein.

Figure 1B:
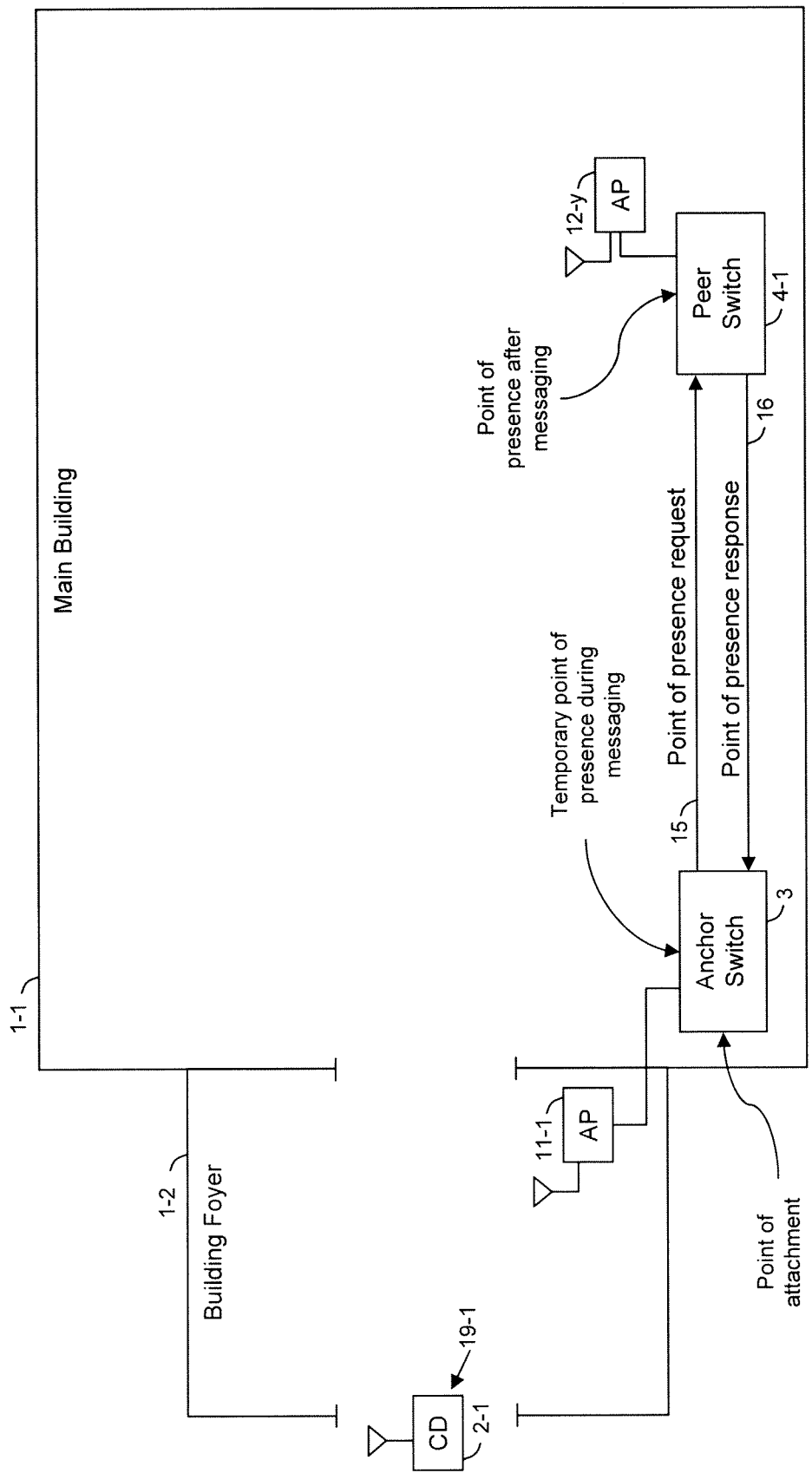
FIG. 1B is a block diagram of the example communication network environment from FIG. 1A in which a wireless mobile client device first enters the network.
Figure 1C:
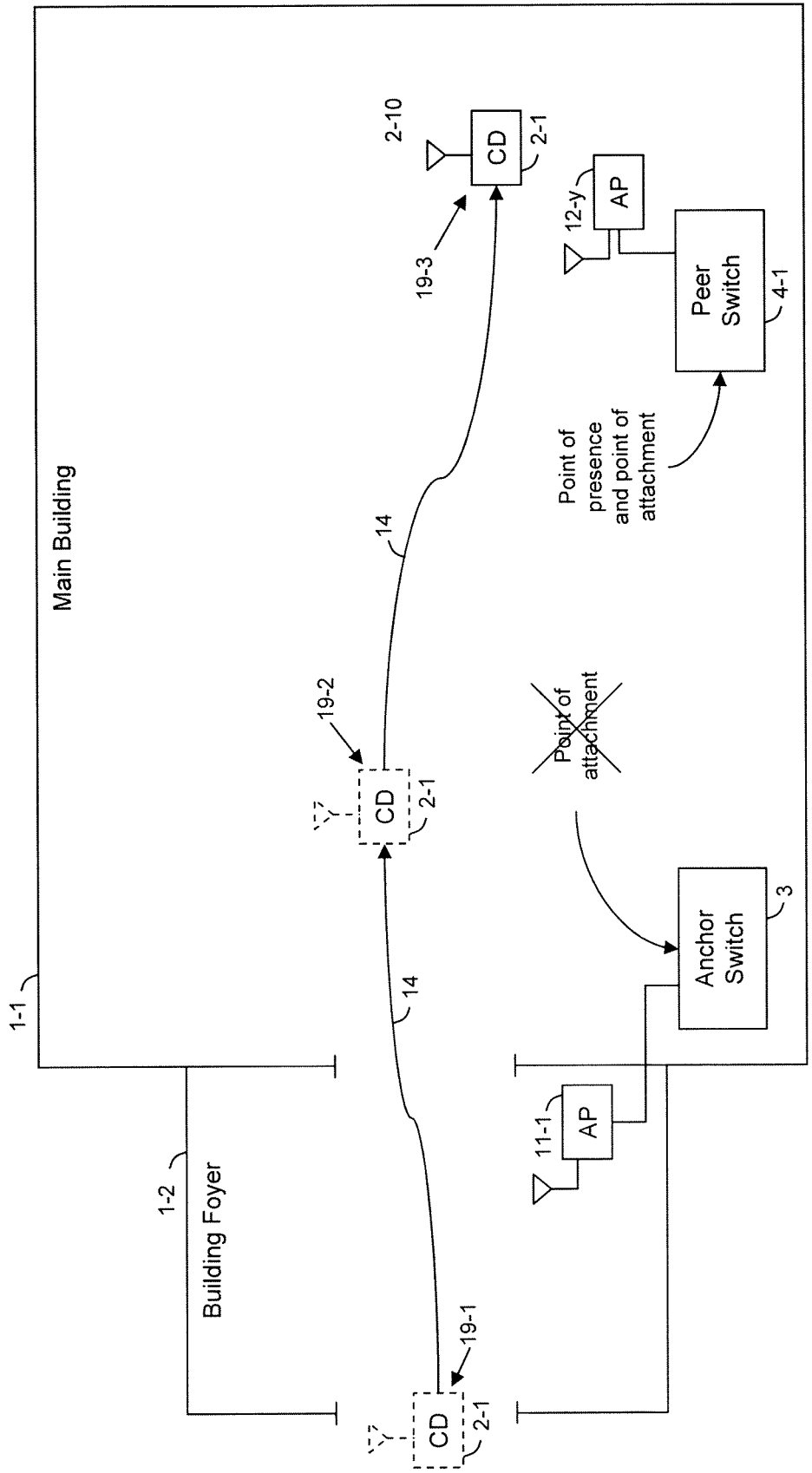
FIG. 1C is a block diagram of the example communication network environment from FIG. 1B in which the wireless mobile client device has roamed to a foreign switch.

Referring to FIGS. 1B and 1C, the point of presence and point of attachment are described according to the techniques provided herein. FIGS. 1B and 1C show the network environment of FIG. 1A in simplified form. FIG. 1B shows CD 2-1 at position 19-1 when first enters the network. Anchor switch 3 provides a point of attachment for CD 2-1 via AP 11-1. Since anchor switch 3 has determined that it will no longer anchor for new CDs it initiates the point of presence transfer mechanism by way of messages 15 and 16, as described above. During the messaging period, anchor switch 3 provides a temporary point of presence for CD 2-1. After messaging is complete, peer switch 4-1 becomes CD 2-1's anchor switch and provides a point of presence for CD 2-1.

FIG. 1C depicts the network environment after CD 2-1 has roamed to position 19-3. At some point along path 14 CD 2-1's point of attachment changes from anchor switch 3 to peer switch 4-1, and anchor switch 3 is released from responsibility for CD 2-1. Anchor switch 3 can release CD 2-1's IP address to the DHCP address pool. Peer switch 4-1 provides both a point of presence and a point of attachment. At position 19-3 the point of attachment is maintained by way of AP 12-y. Should CD 2-1 roam again and change its point of attachment to another foreign peer switch. Peer switch 4-1 would continue to anchor and provide a point of presence for CD 2-1.

Figure 2:
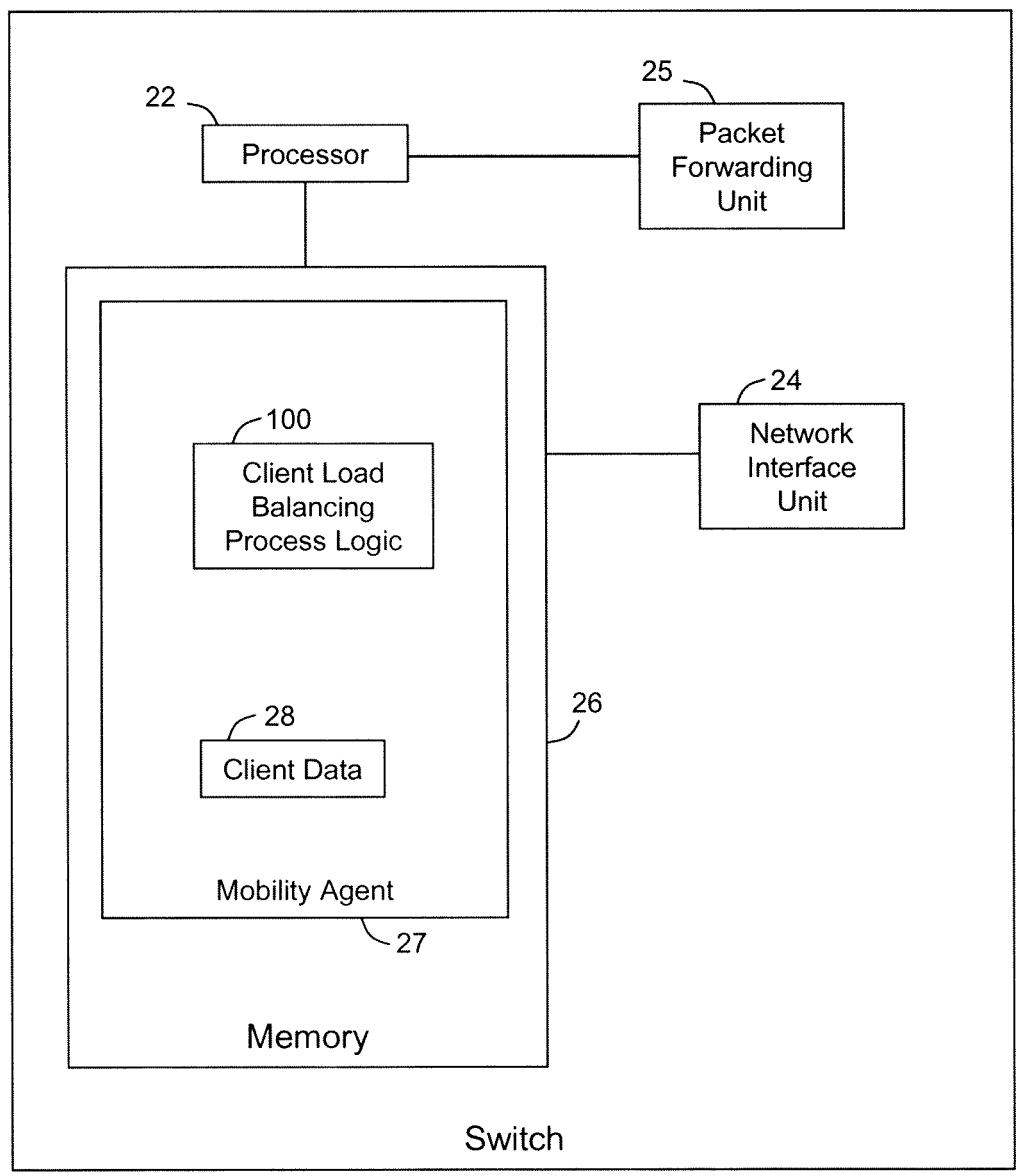
FIG. 2 is a block diagram for an example of a switch that is configured to redirect a point of presence for a wireless mobile client device according to the techniques described herein.

Referring now to FIG. 2, a block diagram is shown that is meant to represent an example of a block diagram for any of the switches 3, 4-1, 4-2, and 5, which are configured to perform the anchor switch client load balancing techniques described herein. There is a processor 22, a network interface unit 24, a packet forwarding/switching (ASIC) unit 25 and a memory 26. The processor 22 is for example, a microprocessor, a microcontroller, a digital signal processor, etc. The network interface unit 24 is a device that is configured to enable communications over a wired network according to any of a variety of networking protocols. While not shown, there are a plurality of ports associated with network interface unit 24 for receive incoming traffic and forwarding outgoing traffic. The packet forwarding/switching unit 25 queues packets and forwards them to the appropriate switch port. The packet forwarding/switching unit 25 comprises, for example, one or more application specific integrated circuits (ASICs).

The memory 26 is a tangible processor readable or computer readable memory that stores or is encoded with instructions that, when executed by the processor 22, cause the processor 22 to perform functions described herein. For example, the memory 26 is encoded with instructions for anchor switch client load balancing process logic 300. The process logic 300 is described hereinafter in connection with FIGS. 3 and 4.

While FIG. 2 shows a processing environment comprising a data processor 22 that executes software stored in memory 24, an alternative processing environment is a fixed data processing element, such as an application specific integrated circuit (ASIC) that is configured, through fixed hardware logic, to perform the functions of the client load balancing process logic 100. Yet another possible data processing environment is one involving one or more field programmable logic devices, or a combination of fixed processing elements and programmable logic devices.

The memory 26 may comprise read only memory (ROM), random access memory (RAM), magnetic disk storage media devices, optical storage media devices, flash memory devices, electrical, optical, or other physical/tangible memory storage devices. Thus, in general, the memory 26 may comprise one or more tangible computer readable storage media (e.g., a memory device) encoded with software comprising computer executable instructions and when the software is executed (by the controller processor 22) it is operable to perform the operations described herein in connection with process logic 100.

The memory 26 also stores client data shown at reference numeral 28. The client data comprises data concerning anchor switch CDs and foreign switch CDs that have roamed into a coverage area serviced by the switch's associated APs. For CDs that have roamed to a foreign switch the client data 28 contains a forwarding or "care of" address for forwarding traffic the those anchor switch clients that have roamed away.

Figure 3:
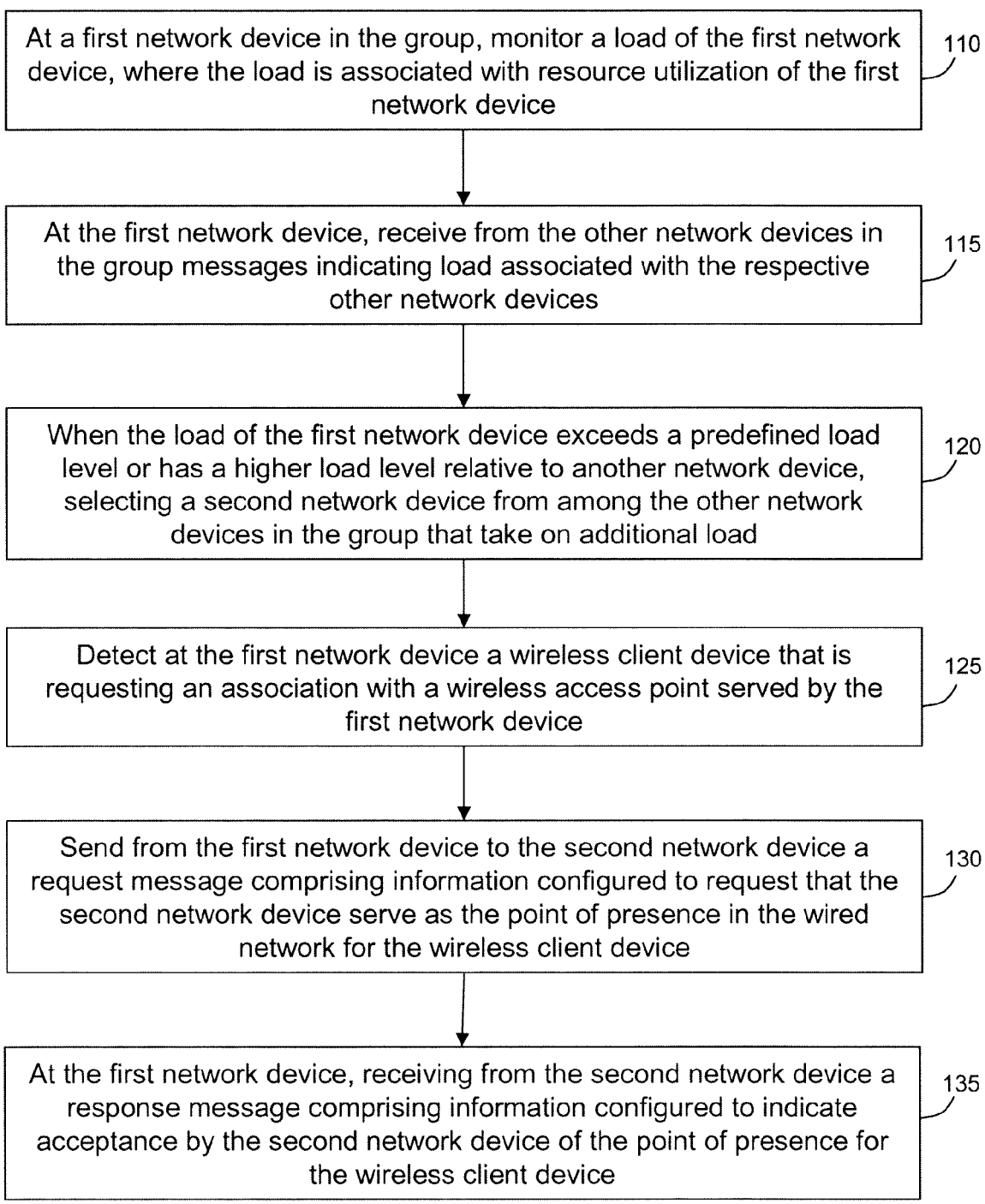
FIG. 3 is a flow chart depicting examples of operations of a point of presence traffic load balancing process for a switch according to the techniques described herein.
Figure 4:
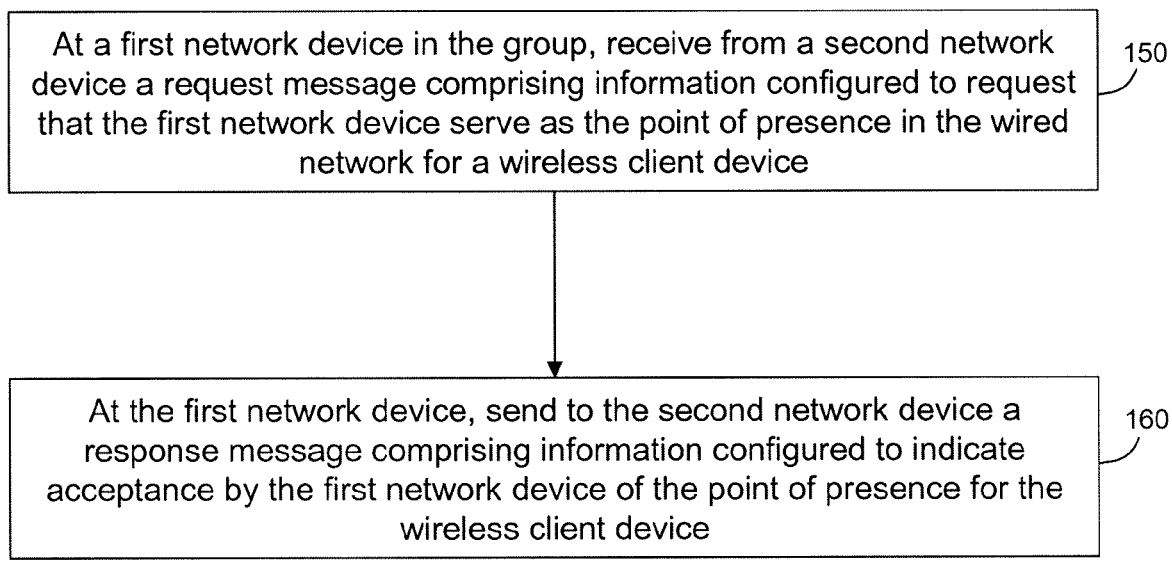
FIG. 4 is a flow chart depicting examples of operations of the point of presence traffic load balancing process for a switch that receives a request to serve as the point of presence for a wireless mobile client device.

Turning now to FIGS. 3 and 4, the client load balancing process logic 100 will now be described. FIG. 3 illustrates a flow chart of a first part of the process logic 100 that runs on a first switch that desires to offload a client's anchor switch (point of presence) processing, e.g., anchor switch 3, to a second switch, e.g., peer switch 4-1. FIG. 4 illustrates a flow chart of a second part of the process logic 100 that runs on the second switch, e.g., switch 4-1. Accordingly, the same process logic can run on an overloaded switch or on an underloaded switch that is able to take on additional anchor switch processing for a new CD, i.e., process logic 100 can run on any of the switches shown in FIG. 1A, and perform the process logic described in connection with FIGS. 3 and 4.

A group of network devices, e.g., switches 3, 4-1, 4-2, 5 (FIG. 1A), is provided that are configured to support network connectivity in a wired network for client devices, e.g., CDs 2-2 to 2-n, that roam between wireless access points served by the respective network devices.

At 110, at a first network device in the group, e.g., anchor switch 3, load is monitored. Monitoring load at the first network device may comprise determining when a number of CDs associated that the first network device serves exceeds a predetermined number and/or determining when one or more of processor utilization, memory utilization, and application specific integrated circuit utilization of the first network device, e.g., anchor switch 3, exceeds respective limits. At 115, at the first network device, messages are received from the other network devices in the group indicating load associated with the respective other network devices. The load messages may be updated periodically. At 120, when the load of the first network device exceeds a predefined load level or has a higher load level relative to another network device, a second network device is selected from among the other network devices in the group that take on additional load. In other words, the first network device determines when the load of the first network device meets a criterion comprising one of exceeding a predefined load level and being higher load level relative to another network device and a second network device is then selected. The second network device may be selected from among the network devices in the group based on a relative utilization level.

At 125, the first network device detects a wireless client device that has associated with a wireless access point served by the first network device. When a new CD attempts to associate with an AP managed by an overloaded switch, rather than serving as the anchor switch for the new CD, the switch serves as a foreign switch for the new CD. The switch discovers the least loaded peer member switch in its group and requests that it serve as the new CD's anchor (point of presence) switch. In other words, the new CD only consumes resources on the overloaded switch for the short duration during which it is the CD's point of attachment. Considering that new CDs in the coverage area of the overloaded switch roam soon after entering a coverage area of an AP served by the overloaded switch, and the overloaded switch need no longer serve as the CD's current point of attachment, as is the situation described in connection with FIGS. 1A, 1B, and 1C.

Moreover, when switches are provisioned with client load balancing process logic 100, a peer switch, and not the overloaded switch, advertises the CD's point of presence after it has roamed. Thus, the CD's resources on the overloaded switch are freed up, and in turn, the overloaded switch's load is stabilized. These techniques may be used to further distribute load "fairly" and uniformly across the peer switch group members.

At 130, a request message is sent from the first network device to the second network device. The request message comprising information configured to request that the second network device serve as the point of presence in the wired network for the wireless CD. With the intent of offloading the load associated with the new CD, an overloaded switch can dynamically determine a least loaded peer switch within its peer switch list/group and send the request message to that peer switch. At 135, at the first network device, a response message is received from the second network device comprising information configured to indicate acceptance by the second network device of the point of presence for the wireless CD.

During the transition, the overloaded switch itself serves as a foreign switch for the new client device. Accordingly, the point of presence responsibility can be successfully offloaded and the task of advertising the CD's point of presence can be transferred to another switch. The second network device to which the point of presence responsibility is transferred transmits messages in the wired network that advertise the point of presence of the new CD at the second network device. In this manner, an overloaded switch deployed at areas with high levels of traffic from roaming clients can be prevented from going out of service due to overload conditions, while at the same time a uniform load distribution may be achieved across the peer switch group. Thus, the techniques described herein prevent a further depletion of switch hardware resources.

When the point of presence responsibilities for a CD are transferred from a first network device to second network device, the following traffic routing occurs for data associated with the CD, The first network device continues to serve as the point of attachment for the CD (for the duration that the CD is associated with an AP served by the first network device) while the second network device serves as the point of presence for the CD so that traffic from the wired network to the CD flows to the second network device, through a tunnel to the first network device, and from the first network device to the access point to which the CD is attached associated, and traffic from the CD flows from the access point to the first network device, through the tunnel to the second network device, and from the second network device into the wired network.

Thereafter, when the first network device detects that a CD has roamed from an access point served by the first network device to an access point served by another network device, e.g., peer switch 4-1 or peer switch 4-2 in the example of FIG. 1A, the first network device, e.g., anchor switch 3 in the example of FIG. 1A, discontinues serving as the point of attachment for the CD. Thus, at this point, the anchor switch 3 is completely freed up from both point of presence and point of attachment responsibilities for the CD. Nevertheless, the peer switch to which the point of presence responsibility was transferred (by the anchor switch 3), continues to serve as the point of presence for the CD after it is roamed from an AP served by the first network device (which initially served as its point of presence and point of attachment) to an AP served by another network device. It is possible, as described above, that the CD may roam and thus establish a point of attachment with an AP that is served by the same network device that has taken on the point of presence responsibility for the CD.

Turning to FIG. 4, process logic 100 is described with respect to operations performed when a switch receives an offload request. In this example, the first network device is arbitrarily designated as the switch that receives a request message to take on the point of presence responsibilities from another switch, arbitrarily referred to as a second network device. At 150, at a first network device in the group, a request message is received from a second network device. The request message comprises information configured to request that the first network device serve as the point of presence in the wired network for a wireless client device that is associated with an AP served by the second network device. At 160, the first network device sends a response message to the second network device comprising information configured to indicate acceptance by the first network device of the point of presence for the wireless client device.

The above described techniques provide several advantages, including conserving switch hardware resources and the associated DHCP address pools for switches deployed in areas with a high concentration of roaming clients; stabilizing the load on an overloaded switch and prevent it from failure, or from rejecting future association requests, given that the up time of a switch deployed in areas of high client concentration is critical; and uniformly distribute the load across a switch peer group.

In sum, techniques are described herein to provide a group of network devices configured to support network connectivity in a wired network for client devices that roam between wireless access points served by the respective network devices. At a first network device in the group, a load associated with resource utilization of the first network device is monitored. At the first network device, messages are received from the other network devices in the group indicating load associated with the respective other network devices. When the load of the first network device exceeds a predefined load level or has a higher load level relative to another network device, a second network device is selected from among the other network devices in the group that can take on additional load. At the first network device, a wireless client device is detected that has associated with a wireless access point served by the first network device, and a request message is sent from the first network device to the second network device comprising information that is configured to request that the second network device serve as a point of presence in the wired network for the wireless client devices. At the first network device, a response message is received from the second network device comprising information configured to indicate acceptance by the second network device of the point of presence for the wireless client device.

Although the techniques are illustrated and described herein as embodied in one or more specific examples, it is nevertheless not intended to be limited to the details shown, since various modifications and structural changes may be made therein without departing from the scope of the and range of equivalents of the claims.

What is claimed is:
1. A method comprising:
providing a group of network devices configured to support network connectivity in a wired network for client devices that roam between wireless access points served by the respective network devices;
at a first network device in the group, monitoring a load of the first network device, wherein the load is associated with resource utilization of the first network device;

at the first network device, receiving from the other network devices in the group messages indicating load associated with the respective other network devices;

when the load of the first network device meets a criterion comprising one of exceeding a predefined load level and being a higher load level relative to another network device, selecting a second network device from among the other network devices in the group that can take on additional load;

detecting at the first network device a wireless client device that has associated with a wireless access point served by the first network device; and sending from the first network device to a second network device a request message comprising information configured to request that the second network device serve as the point of presence in the wired network for the wireless client device.

2. The method of claim 1, and further comprising, at the first network device, receiving from the second network device a response message comprising information configured to indicate acceptance by the second network device of the point of presence for the wireless client device.

3. The method of claim 1, wherein monitoring load at the first network device comprises determining when a number of wireless client devices which the first network device serves exceeds a predetermined number.

4. The method of claim 1, wherein monitoring load at the first network device comprises determining when one or more of processor utilization, memory utilization, and application specific integrated circuit utilization exceeds respective limits.

5. The method of claim 1, wherein selecting comprises selecting the second network device from among the network devices in the group based on a relative hardware utilization level.

6. The method of claim 1, and further comprising, at the second network device, transmitting messages in the wired network that advertise the point of presence of the wireless client device at the second network device.

7. The method of claim 1, and further comprising the first network device serving as the point of attachment for the wireless client device while the second network device serves as the point of presence for the wireless client device so that traffic from the wired network to the wireless client device flows to the second network device, through a tunnel to the first network device, and from the first network device to the access point to which the wireless client device is associated, and traffic from the wireless client device flows from the access point to the first network device, through the tunnel to the second network device, and from the second network device into the wired network.

8. The method of claim 7, further comprising detecting at the first network device when the wireless client device roams from an access point served by the first network device to an access point served by another network device; and the first network device discontinuing serving as the point of attachment for the wireless client device when it has roamed to another network device.

9. The method of claim 8, and further comprising the second network device continuing to serve as the point of presence for the wireless client device after it has roamed from an access point served by the first network device to an access point served by another network device.

10. An apparatus comprising:
a network interface unit configured to send and receive messages over a wired network in which a group of network devices are configured to support network connectivity for client devices that roam between wireless access points served by the respective network devices;
a processor configured to:
monitor a load of the apparatus, wherein the load is associated with resource utilization of the apparatus;
receive from the other network devices in the group messages indicating load associated with the respective other network devices;
when the load meets a criterion comprising one of exceeding a predefined load level and being a higher load level relative to another network device, select a network device from among the other network devices in the group that can take on additional load;
detect that a wireless client device has associated with a wireless access point; and
send to the selected network device a request message comprising information configured to request that the selected network device serve as the point of presence in the wired network for the wireless client device.

11. The apparatus of claim 10, wherein the processor is further configured to receive a response message configured to indicate acceptance by the selected network device of the point of presence for the wireless client device.

12. The apparatus of claim 10, wherein the processor is configured to monitor load to determine when a number of wireless client devices served exceeds a predetermined number.

13. The apparatus of claim 10, wherein the processor is configured to monitor load to determine when one or more of processor utilization, memory utilization, and application specific integrated circuit utilization exceeds respective limits.

14. The apparatus of claim 10, wherein the processor is configured to select the network device from among the network devices in the group based on a relative hardware utilization level.

15. The apparatus of claim 10, wherein the processor is further configured to detect when the wireless client device roams to an access point served by another network device, and to discontinue performing operations that serve as the point of attachment for the wireless client device when it has roamed to another network device.

16. A computer memory device storing computer executable instructions that, when executed by a computer, cause the computer to:
communicate via a network interface unit to send and receive messages over a wired network comprising a group of network devices configured to support network connectivity in a wired network for client devices that roam between wireless access points served by the respective network devices;
at a network device, monitor a load of the network device, wherein the load is associated with resource utilization of the network device;
receive from the other network devices in the group messages indicating load associated with the respective other network devices;
when the load meets a criterion comprising one of exceeding a predefined load level and being a higher load level relative to another network device, select a network device from among the other network devices in the group that can take on additional load;
detect that a wireless client device has associated with a wireless access point; and
send to the selected network device a request message comprising information configured to request that the selected network device serve as the point of presence in the wired network for the wireless client device.

17. The memory device of claim 16, further comprising instructions that, when executed by the computer, cause the computer to receive a response message configured to indicate acceptance by the selected network device of the point of presence for the wireless client device.

18. The memory device of claim 16, wherein the instructions that cause the computer to monitor comprise instructions that cause the computer to monitor load to determine when a number of wireless client devices that the network device serves exceeds a predetermined number.

19. The memory device of claim 16, wherein the instructions that cause the computer to monitor load to determine when one or more of processor utilization, memory utilization, and application specific integrated circuit utilization of the network device exceeds respective limits.

20. The memory device of claim 16, wherein the instructions that cause the computer to select comprise instructions that cause the computer to select the network device from among the network devices in the group based on a relative hardware utilization level.

21. The memory device of claim 16, further comprising instructions that cause the computer to detect when the wireless client device roams to an access point served by another network device, and to discontinue performing operations that serve as the point of attachment for the wireless client device when it has roamed to another network device.

* * * * *